INVENTOR.
Frederick G. Eis

Aug. 11, 1970      F. G. EIS      3,523,889
METHOD AND APPARATUS FOR SEPARATING LIQUIDS FROM SOLIDS
Filed Nov. 26, 1968      2 Sheets-Sheet 2
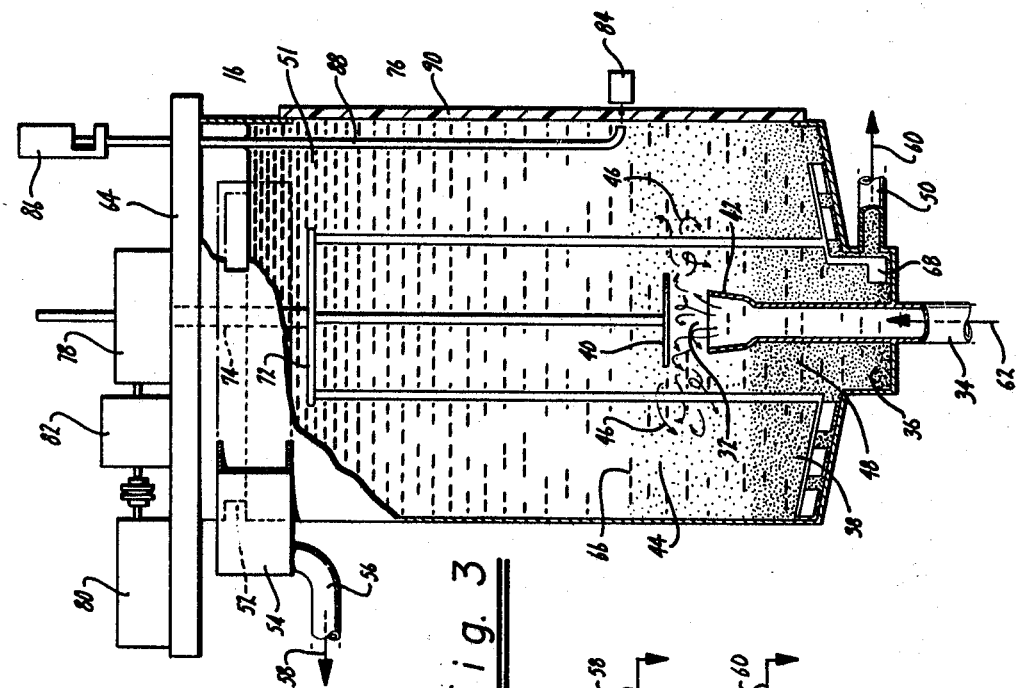
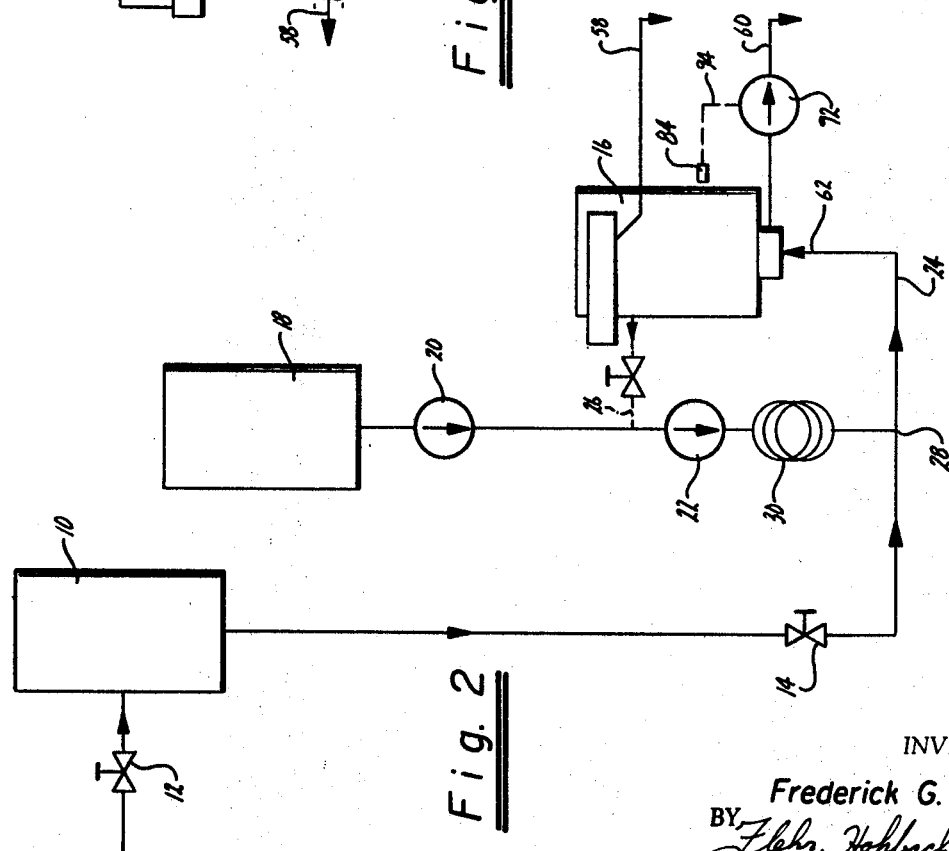
INVENTOR.
Frederick G. Eis
BY Flehr, Hohbach, Test,
Albritton & Herbert
Attorneys

United States Patent Office 3,523,889
Patented Aug. 11, 1970

3,523,889
METHOD AND APPARATUS FOR SEPARATING LIQUIDS FROM SOLIDS
Frederick G. Eis, Woodland, Calif., assignor to American Sugar Company, New York, N.Y., a corporation of Delaware
Filed Nov. 26, 1968, Ser. No. 779,089
Int. Cl. B01d *21/01*
U.S. Cl. 210—20                                    11 Claims

ABSTRACT OF THE DISCLOSURE

A method and apparatus for rapidly and continuously separating finely divided and suspended solid materials from liquids, at a predetermined controlled rate, involving initially agglomerating at least part of the solids through use of a settling aid and thereafter causing additional agglomeration of the solids to produce a rapidly setting, easily removable dense underflow of agglomerates and entrained solids. The additional agglomeration is carried out in the presence of previously formed agglomerates under controlled conditions, and in the absence of reliance on a free settling zone. The rate of removal of the dense underflow effects a degree of control over the settling bed depths and the density of the underflow. The clarified liquid is removed as a clear overflow. Both the clear liquid and the dense underflow are recoverable as end products, depending upon the particular liquid-solid system undergoing processing.

BACKGROUND OF INVENTION

This invention relates, generally, to methods and apparatus for continuously separating finely divided and suspended solids from liquids, and more particularly, to methods and means making possible the rapid agglomeration, settling and removal of solids from liquids, following which the clarified liquid or separated solid is recoverable as an end product.

The present invention has particular application in the treatment and clarification of various liquid wastes, including commercial and municipal waste waters, such as factory waste liquors and partially clarified sewage. As is well known, problems arising from the presence of suspended solids are encountered with various types of industrial waste liquids. For example, waste liquids from beet and cane sugar manufacture, waste liquids from canneries, breweries, meat packing plants, rendering plants and other food processing plants, contain large amounts of finely divided and suspended solids as well as colloidal solids. In like fashion, liquid treating processes, such as waste and potable water treatments, lime-soda water softening and industrial water supply treatments, produce large amounts of effluent liquids containing waste solids. The chemical industries also produce large quantities of fluid wastes containing suspended solids. Examples include sulphite wastes from paper mills, cannery wastes, fermetation "slops," zeolite brines, etc.

In addition to the forgeoing, it is frequently desirable to recover suspended solids from processed liquids for refining or re-use in the process. By way of illustration, it is frequently desirable to recover pigments or suspended particles of coal from aqueous suspensions derived from factory operations. It likewise is frequently desirable to process effluents in pharmaceutical operations for the recovery of valuable products, as well as the removal of undesirable byproducts. In short, there is a general widespread need for satisfactory procedures useful in the processing of aqueous effluents of all types to facilitate the removal of suspended solids.

Heretofore, processes developed for the purposes of separating suspended solids from liquid have generally involved use of filtration apparatus, such as rotary drum filters, or large slow-acting settling chambers, or both. The principal difficulty with such separation techniques and apparatus has been the prolonged periods of time required to effect settling or separation, and the relatively large capacity and expense required for the separation equipment. These create even further problems arising as the result of an enforced inflexibility in the use and placement of machinery and equipment within an otherwise efficient factory design. The development of an efficient, rapid, easily controlled technique for separating finely divided and suspended solids from liquids is therefore highly to be desired.

SUMMARY OF INVENTION AND OBJECTS

Generally speaking, the present invention is directed to a method and means for the rapid, continuous separation of finely divided and suspended solid materials from liquids, in an efficient, controlled manner. Broadly, the method of the present invention involves three general operations or phases: First, the agglomeration or partial agglomeration of the suspended solids in a liquid feed by the addition of a small amount of a settling aid. Next, the partially agglomerated liquid feed is introduced to a settling zone containing a relatively greater proportion of agglomerates per unit of volume to cause additional agglomeration of the solids and a consequent rapid settling of the solids together with entrainment of individual solid particles. Finally, the dense mass of rapidly settling agglomerates and entrained solids is rapidly removed as a dense underflow, at a controlled rate and in a continuous process, the clear liquid being simultaneously removed as a clear overflow. The broad processing is, of course, subject to a number of specific variations: Thus, the dense overflow can be partially recycled to the settling zone to control underflow densities as well as the nature of the solids removed from process; processing rates can also be varied as to time, turbulence, proportion, etc., to achieve various desired processing results.

Apparatus for carrying out the foegoing method provides for the introduction of the partially agglomerated liquid feed directly to a settling zone within a settling vessel, comparable to the intermediate settling zone in sedimentation systems known heretofore. A particularly satisfactory apparatus includes standpipe means and arresting baffle means positioned within the settling vessel in such manner as to assure an unusually rapid settling operation, hereinafter described. In general, the settling method and apparatus of the present invention makes possible the effective separation of suspended solids from liquids in periods of time ranging from one-tenth to one-hundredth the time heretofore required to obtain equivalent results.

It is a general object of the present invention, therefore, to provide a method and means for the continuous separation of liquids from solids which achieve a more rapid and economical separation than has been possible heretofore with prior procedures and apparatus for such purposes.

Another object of the invention is to provide a relatively simple, highly effective means for treating waste waters and other liquid systems for purposes of separating and removing therefrom finely divided and suspended solids.

A further object of the invention is to provide a method and means of such character capable of use with a wide variety of liquid-solid systems to effect a complete separation of the liquid and suspended solid components.

Another object of the invention is to provide an improved method and means of such character that does not require complicated procedures or machinery, and which is adaptable to virtually any present-day system for treating systems of liquids containing suspended solids.

Another object of the invention is to provide an improved system for accomplishing the settling and removal of suspended solids which is highly efficient in that it removes virtually all of the suspended solids present in the liquid system.

Another particular object of the invention is to provide an improved method and means of such character which effects the separation of suspended solids from liquids in one-tenth to one-hundredth of the time heretofore required by prior systems.

Additional objects and advantages of the invention will appear from the following description in which the preferred embodiments have been set forth in detail in conjunction with the accompanying drawing.

BRIEF DESCRIPTION OF THE DRAWING

FIG. 2 is a schematic representation of a type of apparatus which may be used in carrying out the invention.

FIG. 3 is an enlarged schematic representation of a portion of the apparatus of FIG. 2, illustrating a particular embodiment of a settling chamber useful in carrying out the present invention.

DESCRIPTION OF PFERERRED EMBODIMENTS

Figure 1:
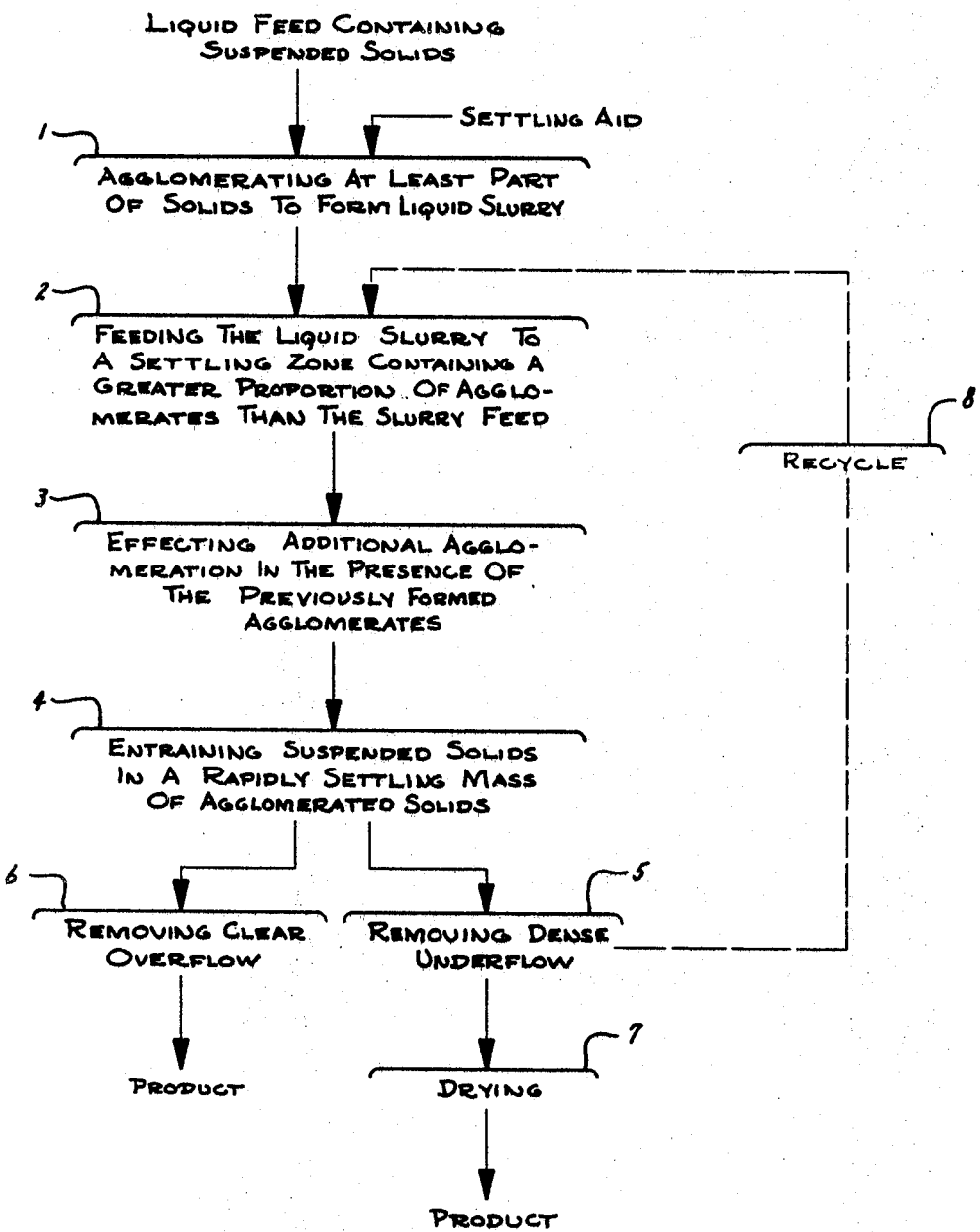
FIG. 1 is a flow sheet illustrating a general method of carrying out the invention.

Referring to the drawings, FIG. 1 represents a general flow sheet illustrating the main steps of the method of the present invention.

In step 1, a liquid feed containing suspended solids is continuously mixed with a quantity of settling aid (about 0.1 to 30 parts per million) to effect at least a partial agglomeration of the suspended solids. Settling aids capable of agglomerating the suspended solids in accordance with the present invention include the group of polyelectrolytes, and particularly the group of organic copolymers of acrylamide having molecular weights (estimated) at between two and three million. Polyelectrolyte settling aids of this type are generally disclosed, for example, in U.S. Pat. 3,025,236, 3,033,782, and 3,157,595.

In step 2, the liquid slurry containing agglomerated solids is continuously introduced as an influent feed to a zone of settling within a separation vessel filled with a previously formed liquid slurry containing a relatively greater proportion of agglomerated solids per unit of volumn than the influene feed.

In step 3, additional agglomeration of the suspended solids is effected by the intermixing of the influent feed containing freshly agglomerating solids with the previously formed agglomerates in the settling zone. As noted below, this step is necessarily carried out simultaneously with the further processing outlined in steps 4, 5 and 6.

In step 4, suspended solid particles which have not coalesced into the agglomerates are entrained and physically removed as part of the rapidly settling agglomerates in the settling zone.

In step 5, the agglomerates and entrained solids are rapidly removed as a dense underflow from the settling zone simultaneously with removal, in step 6, of the clarified liquid as a clear overflow.

It will be apparent that the clarified liquid can be appropriately removed as an end product. The dense solid underflow can be further processed, likewise be removed, with or without further processing, for exmaple, as by drying in step 7, to produce an end product. Alternatively, the clarified liquid and/or the solids may be discarded, burned or otherwise disposed of.

In step 8, represented by dotted lines in FIG. 1, the dense underflow can be recycled to become part of the influent feed of liquid slurry, the proportion of underflow and the rate of recycling being established to control the density of the underflow. As hereinafter described, such recycling provides advantages in many liquid-solid separation systems.

It is possible to employ various commercially available settling aids as the settling agents in step 1, including the group of high molecular weight polyacrylamide settling aids disclosed in the U.S. patents mentioned above. Polymers of this type having molecular weights within the range from about two to three million are generally to be preferred. Particular polyacrylamide resins useful in carrying out the invention include a number of commercially available products. One such product is a high molecular weight synthetic copolymer containing amide and carboxylic groupings (Separan AP30, manufactued by Dow Chemical Co.) which has an approximate composition as represented by the following formula:

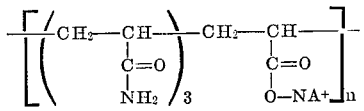

Another highly satisfactory settling aid available in the form of a modified polyacrylamide resin is produced by the copolymerization of acrylamide with not more than 5-mol percent β-methacrylyloxyethyltrimethylammonium methyl sulfate. This polyacrylamide resin (for example, Betz polymer 1420, manufactured by Betz Manufacturing Corporation) is effectively used in amounts ranging from less than 1 to as much as 30 parts per million by weight of the liquid-solid system undergoing treatment. In general, it has been found desirable to use the polyacrylamides and like anionic polymers in the form of dilute aqueous solutions. The characteristics of these settling aids facilitates their use in systems where the pH is near neutral or higher. The dilute aqueous solutions are also easily added to the entering of aqueous feed, in desired proportional amounts, using conventional proportional feeders and metering units. However, it should be understood that any settling aid which produces agglomeration of solids to a substantial degree can be employed in the processing herein disclosed to achieve appreciable improvements over present practices.

FIG. 2 illustrates a system of apparatus suitable for carrying out the continuous process described above in conjunction with FIG. 1. A liquid feed containing suspended solids (for example, first carbonation juice from a beet or cane sugar factory), is introduced to a suitable defoaming tank 10 through a flow control valve 12. Sugar liquors of this type normally contain up to 5 percent suspended solids (viz, calcium carbonate, vegetable fibers and like impurities) of particle size ranging from 0.1 to 100 microns. The defoamed liquid flows by gravity from the tank 10 through the flow control valve 14 to the settling tank 16. Prior to entering the settling tank, an anionic polyeslectrolyte settling aid is metered from the tank 18 through the variable speed proportioning pumps 20 and 22 to the inlet feed line 24. In the case of the Betz 1420 and Separan AP30 settling aids, the settling aid is generally added from a 0.5 percent stock solution with pipeline dilution by means of settler overflow, through the line 26, to obtain a 0.025 percent solution at the point of addition to the feed (represented at 28). To insure proper dispersion of the settling aid in the solution mixed with the feed, a relatively long length of conduit in the form of a coil 30 is advantageously employed.

The net effect of the addition of the settling aid to the solids-containing feed is to initiate the fresh formation of agglomerates within the influent feed as it is introduced to the settling tank 16. While the exact mechanism by which the polyacrylamide settling aids cause agglomeration of suspended solids is not known, it is strongly indicated that the settling aids (in the form of long straight-chain polymers) are adsorbed by the suspended solids, forming strong bonds between the polymer and the solid. After one end of the long molecule is adsorbed by a suspended solid particle, the rest of the molecule is still free in the suspension to be adsorbed by other particles. In the presence of many polymer molecules in solution, the described action quickly results in agglomeration and flocculation of the particles in the suspension. Moreover, because the long organic molecule agglomerates particles through an adsorption mechanism, the bond between the settling aid and the suspended particles forms quickly and substantially irreversibly. The agglomerates thus tend to hold together throughout the settling operation in the settling tank 16.

As shown in detail in FIG. 3, the liquid feed in the form of a slurry containing freshly agglomerating solids, is introduced at a centralized position between the bottom and top of the settling vessel, represented at 32. In the illustrated apparatus, this is accomplished by means of a standpipe 34 which passes through a well 36 provided in the bottom 38 of the tank to a height substantially above the bottom of the tank. In general, it is desirable that the point of entry 32 is at least six inches above the bottom of the tank. It has also been found desirable to arrest the upward motion of the influent feed immediately above the point of entry. This can be simply accomplished by a baffle or other arresting means 40 positioned closeljy adjacent and above the point of entry 32. The upper end 42 of the standpipe may also be slightly flared to further assist in arresting the rate of flow of the influent feed at the point 32. The net effect is to cause a gradual reduction in flow velocities coupled with a radial dispersion and intermixing of the influent feed with the concentrated solids-containing liquid in the settling zone surrounding the standpipe, generally represented at 44 in FIG. 3.

As previously noted, it is a feature of the present invention that the entering slurry of freshly agglomerating solids is introduced into the midst of a gently agitated, sedimenting, previously formed liquid slurry containing a relatively greater proportion of agglomerated solids per unit of volume than is present in the influent feed. Thus, as is particularly shown in FIG. 3, the feed percolating outward from the point of entry 32 (arrows 46) comes into contact with previously formed agglomerates of solid particles moving within the settling zone 44. The effect of this intermixing of the newly agglomerating solids with the previously formed aglomerates is to cause additional agglomeration and coalescence of the solids into relatively large agglomerates which tend to rapidly sediment into a sludge zone 48 at the bottom of the tank.

In a preferred practice of the invention, the sludge falling into the zone 48 is rapidly removed as a dense underflow through a bottom outlet 50, provided within the well 36. Simultaneously, a clarified overflow 51 is removed from the top of the settling chamber through a peripheral opening 52 formed in an upper portion of the settling tank 16. The clarified effluent is then collected in a trough 54 for discharge through a bottom outlet 56. The simultaneous removal of the clarified effluent and dense underflow, represented by the arrows 58 and 60, is carried out as part of a continuous process in which the rates of flow depend generally upon the rate of feed of the influent liquid slurry, at 62.

Referring again to FIG. 3, the deflecting baffle 40 can be adjustably mounted in the top 64 of the settling tank to facilitate variations in the point at which the upward movement of the entering feed is arrested. It has been found, for example, that the entering feed should be arrested at a point at least two inches above the point of entry 32 to insure a desired radial dispersion of the entering, freshly agglomerating solids. It has additionally been found desirable to have a settling bed 44 of sufficient depth to extend above the arresting baffle 40, if the desired inermixing and formation of relatively large agglomerates is to be satisfactorily achieved. Thus, the upper boundary of the settling bed, represented at 66, is preferably at least two inches above the deflecting baffle 40. The depth and condition of the settling bed can be additionally maintained by means of a suitable mechanical rake 68, positioned between the underflow discharge 50 and the stand pipe 34. As illustrated, the individual members of the rake can be mounted on depending supports 70 carried by a rotary disc and collar combination 72, 74 associated with an adjustable support 76 for the baffle 40. The rake is driven through the collar 74 by means of suitable gears contained in the housing 78 and cooperating with the drive or motor 80 through reduction gearing 82.

If desired, the depth of the settling bed can be further maintained by means of a photo-eletcric cell 84. As illustrated in FIG. 3, the photo-electric cell 84 is sensitive to light transmitted by a lamp 86 through a clear plastic rod 88. A sight glass 90 is provided in the side of the settling tank to permit the photo-electric cell to freely scan the light transmissions of the rod 88. In operation, the photo-electric cell 84 operates to control the underflow discharge pump 92 (see FIG. 2) through suitable electric circuitry, represented schematically at 94. In general, the speed of the motor 92 is adjusted to slightly exceed the underflow requirements of the settling tank, with the amount of underflow being regulated by an on-off relay positioned within the circiut for the electric eye. When the settling bed increases to a height which brings it between the tube 88 and the eletcric eye 84, the turbidity of the liquid causes the pump 92 to be turned on to withdraw the underflow at a faster rate than it is formed. However, as soon as the zone of turbidity of the settling solids passes to a level below the electric eye, the pump 92 is shut off to allow the height of the settling bed to gradually increase to its original level. In this fashion, the settling bed is maintained below a relatively stationary, clearly defined upper boundary, represented at 66.

OPERATION

The overall operation of the apparatus just described, in carrying out the method of the invention, can be briefly summarized as follows:

The entering feed, after being defoamed as may be necessary in the defoaming tank 10, is passed through the flow control valve 14 to the settling tank 16. Settling aid from the storage tank 18 is metered through the proportioning pumps 20, 22 and the mixing coil 30 to a point of mixing 28 with the entering feed. The entering feed, containing freshly forming agglomerates, enters the settling tank through the standpipe 34 unitl it reaches a point of arrested upward motion, represented at 32. At this stage, the entering feed is surrounded by a previously formed liquid slurry containing a relatively large proportion of agglomerated solids per unit of volume than the feed and, upon being deflected radially outward by the baffle 40, generates persistent contacts with these previously formed agglomerates. The effect of intermixing the freshly forming agglomerates with the agglomerates already present is to cause additional agglomeration and coalescence of the solids into relatively larger agglomerates, which tend to rapidly settle within the settling zone 44. Generally the proportion of agglomerates within the settling zone 44 is comparable to that of an intermediate or slightly compacted zone within a conventional settling chamber, thereby insuring the desired intermixing of the feed with the surrounding agglomerates. The resulting relatively large agglomerates form a dense, free-falling mass of solids which effectively filters the feed liquid to remove suspended solid particles which have not yet coalesced into agglomerates. The clear juice in the meantime percolates up through a multiplicity of continuously changing channels formed within the settling zone 44, providing a gentle agitation throughout upper portions of this zone. The effect of the described motion is to make possible a rapid settling of the relatively large agglomerates, even at relatively high rates of feed of solids-containing liquids to the settler. A dense underflow of agglomerates and entrained solid particles is thereafter rapidly removed through the bottom outlet 50 in response to the control of the underflow discharge pump 92, the settling bed height being maintained throughout by the pump 92 in response to the control of the photo-electric cell and lamp control unit 84, 86. Underflow removal is facilitated by operation of the rotary rakes 68 which function to move the agglomerates into the discharge trough or well 36, where they are sucked into the discharge outlet 50. At the stame time, clarified liquid passes up through the settling chamber and is discharged through the annular chamber 54 and top outlet 56.

The above-described continuous method and apparatus for separating suspended solids from liquids has been found to be highly effective in achieving a rapid and complete separation of the liquid-solid components. By way of specific illustration, separations of first carbonation sludges from beet sugar factory operations (which normally require average settler retention times of the order of 80 minutes) are effectively accomplished with the separation technique herein described at average settler retention times of less than five minutes. Similar results are obtained, for example, in the separation of muds from main and flume waste waters, or in water softening by the lime-soda process, or in the treatment of various other liquids containing finely divided and suspended solids. In general, the processing of the present invention makes possible greatly reduced settling times, ranging from one-tenth to one-hundredth the time previously required for satisfactory results. The described processing and apparatus also provide advantages by virtue of the inherent simplicity in structure and operation (offering substantial reductions in factory shutdown and operating problems) as well as substantial reductions in capital expenditures for equipment. Of particular importance is the advantage offered by a substantially complete separation of solids from liquids made possible by the described method, consistent with the substantial reductions possible in time and expense.

EXAMPLES

In carrying out the processing according to the present invention, it has been found that the rate of influent feed to the settler has a definite effect on the underflow density and the clarity or brilliance of the overflow. Thus, at a constant rate of addition of the settling aid, a reduction in the feed rate produces an immediate concurrent shrinking of the settling bed, whereas an increase in the influent feed rate results in a similar expansion of the settling bed. The effect of variations in the feed rate on underflow density and overflow clarity is illustrated by the data set forth in Table I below:

TABLE I.—FLOW RATE EFFECTS

| Feed g.p.m. | Underflow Brix | Overflow clarity Kopke units |
|---|---|---|
| 21 | 45 | 200 |
| 16 | 75 | 300 |
| 8 | 57 | 170 |
| 17 | 47 | 120 |
| 20 | 45 | 150 |
| 11 | 47 | 250 |
| 20 | 34 | |
| 21 | 35 | 200 |
| 13 | 52 | 140 |
| 18 | 44 | |
| 21 | 35 | 120 |

The foregoing table represents the results of separating suspended solids from first carbonation beet juices during four different processing periods) in a settling chamber of approximately 50 gallons capacity. The table shows that feed rates of 20 gallons per minute, or higher, can be continuously employed with very satisfactory separation of suspended solids from the liquids. Thus, the clarity readings expressed in Kopke units indicates clarity far above the norm experienced with the Kopke technique. Clarity by the Kopke procedure is determined by the ability to read lettering through an immersion depth of clear liquid in millimeters. Normally, a value of 100 is considered to represent excellent clarity. The table thus indicates clarity readings far beyond the scale of the instrument at feed rates up to 21 gallons per minute and higher. The readings in Table I were determined by interpolative measuring of the depth of immersion in millimeters to a point at which the lettering was still clearly visible. Table I further shows that the underflow density (measured in degrees Brix) was uniformly high, and consistent with the overflow clarity.

To determine the equivalent flow rates in gallons per minute per square foot of settling area, comparisons were made between a 50-gallon capacity settling unit and a smaller, laboratory model of 1550-milliliters capacity. Settling rates determined by comparison are summarized in Table II below:

TABLE II.—FLOW RATES PER UNIT OF AREA

| Settling aid, p.p.m. | Equivalent flow rates in g.p.m. per ft.$^2$ area | | Underflow Brix | |
|---|---|---|---|---|
| | 50 gal. | 1,550 ml. | 50 gal. | 1,550 ml. |
| 5 | 5.5 | 3.6 | 52-53 | 55 |
| 5 | 5.1 | 3.6 | 53 | 55 |
| 5 | 7.5 | 7.0 | 42 | 34 |
| 5 | 6.4 | 7.0 | 47 | 30 |
| 5 | 4.5 | 3.5 | 58-60 | 56 |
| 3 | 4.4 | 3.5 | 53-55 | 49 |
| 3 | 3.3 | 3.5 | 55 | 47-49 |
| 1.5 | 3.9 | 3.5 | 45 | 41 |
| 1.2 | 3.8 | 3.5 | 40 | 35 |

In the tests summarized in the foregoing table, the overflow from each test was uniformly brilliant at additions of polyacrylamide settling aid within the range from 3 to 5 p.p.m. It is further noted, at 1.2 p.p.m. of polyacrylamide settling aid, a Kopke clarity reading of the order of 100 was recorded for the 50-gallon capacity unit. Underflow density for each of the tests was also uniformly high, and consistent with the clarity of the overflow liquids. The foregoing Table II thus shows that feed rates in the general range of from 3 to about 8 gallons per minute per square foot of settling area produce uniformly satisfactory results. In practice, feed rates ranging from 3 to as high as 10 gallons per minute per square foot of settling area have been employed with little change in the indicated results. With reference to a 50-gallon capacity settling unit, this fact is generally demonstrated by the results in the following Table III which sets forth gravimetric determinations made with respect to the amount of suspended solids, at various rates of flow of the entering feed:

TABLE III.—FLOW RATE EFFECT ON SUSPENDED SOLIDS

| | Fifty gallon settling unit | | | Factory settler | |
|---|---|---|---|---|---|
| | Underflow | | Overflow | | Overflow |
| Feed g.p.m./ft.$^2$ | ° brix | Percent suspended dry sol. | Kopke clarity | Percent suspended solids | Feed g.p.m./ft.$^2$ | percent suspended dry solids |
| 8.1 | 49 | | 300 | .0049 | 0.37 | .0098 |
| 6.7 | 55 | | | .0098 | 0.37 | .0073 |
| 5.4 | 55 | | | .0040 | 0.37 | .0045 |
| 4.7 | 55 | | | .0073 | 0.37 | .0045 |
| 3.8 | 52 | | | .0045 | | |
| 3.8 | | | | .0045 | | |
| 9.2 | 46 | 23.4 | 200 | .0128 | | |
| 8.2 | 47 | 24.2 | 300 | .0088 | | |

In general, the foregoing table shows that the proportion of suspended solids retained in the overflow was equivalent to or less than normally retained with conventional settling units (i.e., a 9,000 cubic foot factory settler), even at the highest rates of feed. Moreover, operations at the highest rates of feed (and the shortest processing times) result in a retention of suspended solids in excess of that normally experienced in factory operations. On the other hand, clarity readings of the overflow were substantially higher than those normally obtained by conventional operations.

It will be seen from the above description that a highly effective and comparatively simple method and means has been devised for rapidly separating suspended solids from liquid-solid systems. A method and means has also been provided whereby such liquid-solid systems may be treated in continuous processing for the removal of insoluble solids, in periods of time which are a fraction of the times previously required by conventional apparatus, and which make possible major capacity increases over present factory settlers. Finally, it has been shown that the new method and apparatus are capable of adjustments with respect to variables in the processing to permit efficient utilization of both in various commercial and industrial applications, to produce the maximum beneficial result. These and other advantages are clearly within the scope of the invention as herein described and claimed.

I claim:

1. A continuous process for rapidly separating finely divided suspended solid materials from liquids at a predetermined controlled rate, comprising the steps of forming a slurry of solid agglomerates in an influent feed of liquid containing finely divided and suspended solids by the addition of a settling aid, forming a settling zone having a relatively stationary upper boundary and containing previously formed solid agglomerates, introducing said influent liquid slurry at a central position within said settling zone and centrally of said previously formed solid agglomerates, arresting the motion of the influent feed and displacing the same outwardly through said previously formed agglomerates to cause additional agglomeration of the solids and the formation without additional agitation of a dense settleable mass of the solids and agglomerates, continuously removing a dense underflow from beneath said settling zone at a rate to maintain said relatively stationary upper boundary, and continuously removing an overflow of clarified liquid from above said upper boundary of said settling zone, whereby separation of the solids and liquids rapidly occurs in said settling zone.

2. A process as in claim 1 wherein said settling aid is a member of the group of organic polyelectrolytes.

3. A process as in claim 2 wherein said polyelectrolyte settling aid is an organic copolymer or acrylamide of molecular weight from about 2,000,000 to 3,000,000.

4. A process as in claim 1 wherein said settling aid is added in a proportion ranging from about 0.1 to 30 parts per million of said influent feed.

5. A process as in claim 1 wherein said influent feed of liquid slurry is introduced at a rate ranging from about 3 to 10 gallons per minute per square foot of cross-sectional filtering area within said zone of settling, said rate of influent feed being sufficient to induct degree of percolation within said zone of settling to increase the rate of additional agglomeration.

6. A process as in claim 1 wherein a portion of said dense underflow is recirculated and intermixed with the influent feed, such recirculation permitting a degree of control over the density of the dense underflow removed from the settling zone.

7. A process as in claim 1 wherein the average retention time of said influent feed in said settling zone is less than about five minutes.

8. A continuous process for treating liquids to remove substances therefrom in the form of solid particles and agglomerated solid particles, which comprises forming and maintaining a settling zone of concentrated slurry containing suspended solid particles and agglomerated solid particles of like nature to those to be formed and sep separated, mixing solids-containing liquid to be processed with a settling and agglomerating agent, said mixing producing a liquid slurry containing freshly agglomerating solids, introducing said liquid slurry as an influent feed at a central position within said settling zone, arresting the motion of said influent feed and displacing the same outwardly through the concentrated slurry in said settling zone to effect additional agglomerations of the solid particles, whereby relatively large agglomerates of solid particles are formed which settle rapidly without additional agitation to form a dense underflow of agglomerates and entrained solid particles, the point of arresting said influent feed being close to said central point of introducton of the influent feed, controlling the depth of said settling zone by withdrawal of said dense underflow so that said settling zone of concentrated slurry is provided with a relatively stationary upper boundary, the rate of withdrawal of said dense underflow being such that said upper boundary of the settling zone is above the point of arresting the motion of the influent feed, and withdrawing clarified liquid from above said settling zone of concentrated slurry.

9. In an apparatus for rapidly and continuously separating finely divided and suspended solid materials from liquids at a predetermined and controlled rate, a settling vessel having top an bottom outlet means, inlet means including conduit means extending to a centralized position within said settling vessel, means for introducing a substantally vertical flow of influent feed of liquid containing freshly agglomerating solid materials to said centralized point of entry established by said conduit means, unitary substantially horizontal baffle means adjacent the point of entry established by said conduit means for arresting and altering the direction of motion of said influent feed whereby the influent feed is directed in a horizontally outward direction with respect to said centralized point of entry, means controlling the rate of discharge of solid materials through said bottom outlet means to control and thereby establish settling and sludge zones above and below said centralized point of entry of influent feed, and means for withdrawing a clarified effluent through said top outlet.

10. Apparatus as in claim 9 wherein said means for arresting and altering the direction of flow of said influent feed comprises vertically adjustable baffle means positioned closely adjacent said point of entry for said influent feed and transverse to the direction of fluid flow.

11. Apparatus as in claim 9 wherein said inlet means includes a flared outlet on said conduit means for effecting a gradual reduction in the flow velocity of said influent feed.

References Cited

UNITED STATES PATENTS

| 1,195,537 | 8/1916 | Van Vloten | 210—207 |
| 2,245,587 | 6/1941 | Hughes | 210—46 |
| 2,365,293 | 12/1944 | Robinson | 210—20 X |
| 2,380,252 | 7/1945 | McBride | 210—20 |
| 2,411,386 | 11/1946 | Parker et al. | 210—207 X |
| 3,353,676 | 11/1967 | Hirsch | 210—519 X |

FOREIGN PATENTS

| 805,526 | 12/1958 | Great Britain. |
| 925,993 | 5/1963 | Great Britain. |

OTHER REFERENCES

Prager, F. D., The Sludge Blanket Clarifier, Water and Sewage Works, vol. 97, April 1950 (pp. 143–152).

MICHAEL E. ROGERS, Primary Examiner

U.S. Cl. X.R.

210—46, 84, 95, 112, 207, 519

REEXAMINATION CERTIFICATE (695th)
United States Patent [19]
Eis

[11] B1 3,523,889
[45] Certificate Issued Jun. 2, 1987

[54] METHOD AND APPARATUS FOR SEPARATING LIQUIDS FROM SOLIDS

[75] Inventor: Frederick G. Eis, Woodland, Calif.

[73] Assignee: American Sugar Company, New York, N.Y.

Reexamination Request:
No. 90/000,751, Apr. 3, 1985
No. 90/001,061, Jul. 29, 1986

Reexamination Certificate for:
Patent No.: 3,523,889
Issued: Aug. 11, 1970
Appl. No.: 779,089
Filed: Nov. 26, 1968

[51] Int. Cl.⁴ ............................................. B01D 21/08
[52] U.S. Cl. .................................. 210/709; 210/713; 210/715; 210/734; 210/801; 210/95; 210/112; 210/207; 210/519
[58] Field of Search ............... 210/709, 713, 715, 725, 210/727, 728, 734, 801

[56] References Cited
U.S. PATENT DOCUMENTS
3,313,725 4/1967 Tsuda et al.

FOREIGN PATENT DOCUMENTS
744223 10/1966 Canada ............................... 182/33

OTHER PUBLICATIONS

K. J. Nix, "The Settling of Cane Muds in an A.T.V. Clarifier" in the Proceedings of the Queensland Society of Sugar Cane Technology, 34th Conference from 3rd to 9th May, 1967, published Apr. 14, 1967, pp. 283–292.
W. H. Ross and K. J. Peatey, "The A.T.V. at Cattle Creek" in the Proceedings of the Queensland Society of Sugar Cane Technology, 32nd Conference, from 28th Apr. to 4th May, 1965, published 1965, pp. 31–35.
K. J. Nix, "Mud Concentration within a Clarifier Tray" in the Proceedings of the Queensland Society of Sugar Cane Technology, 33rd Conference, from 27th Apr. to 3rd May, 1966, published 1966, pp. 103–110.
D. J. Hale and E. Whayman, "AP273 and Other Settling Aids", in the Proceedings of the Queensland Society of Sugar Cane Technology, 34th Conference from 3rd to 9th May, 1967, published Apr. 14, 1967, pp. 301–308.
Operations Report 66/1 "Clarifier Investigations at ISIS Mill", Bureau of Sugar Experiment Stations, Div. of Mill Technology, published Jan. 27, 1967, pp. 1–26 and Appendices I–IV.
R. A. Couche and L. H. Goldney, "The Design of Continuous Thickeners for Flocculated Materials", The Australasian Institute, Mining and Metallurgy, Proceedings, No. 191, published Sep., 1959, pp. 117–139.
R. H. Van Note, "Factors Affecting Capacity and Design of First Carbonation Thickeners", Journal of the A.S.S.B.T., vol. IX, No. 4, published Jan. 1957, pp. 367–376.

*Primary Examiner*—Peter A. Hruskoci

[57] ABSTRACT

A method and apparatus for rapidly and continuously separating finely divided and suspended solid materials from liquids, at a predetermined controlled rate, involving initially agglomerating at least part of the solids through use of a settling aid and thereafter causing additional agglomeration of the solids to produce a rapidly setting, easily removable dense underflow of agglomerates and entrained solids. The additional agglomeration is carried out in the presence of previously formed agglomerates under controlled conditions, and in the absence of reliance on a free settling zone. The rate of removal of the dense underflow effects a degree of control over the settling bed depths and the density of the underflow. The clarified liquid is removed as a clear overflow. Both the clear liquid and the dense underflow are recoverable as end products, depending upon the particular liquid-solid system undergoing processing.

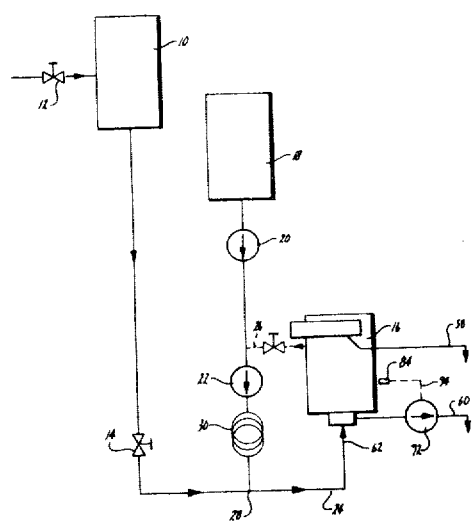

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–11 is confirmed.

* * * * *